Dec. 1, 1959     I. H. FRIEDMAN, JR     2,915,341
DISCHARGE VESSEL WITH MIXING GATE
Filed Dec. 23, 1958     5 Sheets-Sheet 1

INVENTOR.
ISIDORE H. FRIEDMAN JR.
BY
ATTORNEY

Dec. 1, 1959     I. H. FRIEDMAN, JR     2,915,341
DISCHARGE VESSEL WITH MIXING GATE
Filed Dec. 23, 1958     5 Sheets-Sheet 3

INVENTOR.
ISIDORE H. FRIEDMAN JR.
BY
ATTORNEYS

Dec. 1, 1959     I. H. FRIEDMAN, JR     2,915,341
DISCHARGE VESSEL WITH MIXING GATE Filed Dec. 23, 1958     5 Sheets-Sheet 5

INVENTOR.
ISIDORE H. FRIEDMAN JR.

BY
ATTORNEYS

United States Patent Office 2,915,341
Patented Dec. 1, 1959

2,915,341

DISCHARGE VESSEL WITH MIXING GATE

Isidore H. Friedman, Jr., Baton Rouge, La., assignor, by direct and mesne assignments, of one-half to Delta Tank Mfg. Co., Inc., Baton Rouge, La., a corporation of Louisiana, and one-half to Fuller Company, Catasauqua, Pa., a corporation of Delaware Application December 23, 1958, Serial No. 782,557

19 Claims. (Cl. 302—53)

This invention relates to a vessel in which pulverulent material may be stored and from which it subsequently may be discharged in suspension into and carried through a pneumatic conveying line to any desired location, and particularly to such a storage and discharge vessel embodying an easily controlled and operated gate for regulating the amount of pulverulent material which is discharged from the vessel for suspension in the entraining gas.

In the application of Robert F. Loomis, Serial No. 678,798, filed August 19, 1957, now Patent No. 2,891,817, there is disclosed and claimed a pressurized vessel for the storage and subsequent discharge of material into a conveyor line in which the gas for carrying the material through the conveyor line is taken from the pressure gas in the upper portion of the vessel. The vessel of that application is elongated in a horizontal direction and has a gas-permeable deck spaced a slight distance from the bottom and inclined downwardly towards the discharge outlet at one end of the vessel which communicates with the conveying line. A baffle extends across the end of the vessel having the discharge outlet to hold back the main body of pulverulent material in the vessel. The baffle has an opening adjacent the gas-permeable deck and the baffle stops short of the top of the vessel to provide a passage for pressure gas from the upper part of the vessel into the space betwen the baffle and the adjacent end of the vessel. In operation, gas is introduced into the plenum chamber formed between the bottom of the vessel and the gas-permeable deck and passes upwardly through the deck and into the overlying pulverulent material, fluidizing the same. The fluidized material flows downwardly along the upper surface of the inclined deck and through the opening in the baffle to the discharge outlet and connected conveyor line. Since the vessel is sealed, the gas which passes from the upper surface of the fluidized material builds up a pressure in the upper portion of the vessel and upon continued introduction of the gas, the gas passes through the space above the baffle and downwardly through the space between the baffle and the end wall of the discharge conduit. This downwardly-flowing stream of gas flows over and entrains the material on the lower end of the deck which has passed through the opening in the baffle and carries it in suspension into and through the conveying conduit to the desired location.

The present invention relates to a storage and discharge vessel as disclosed in the aforesaid application, and more particularly to such a vessel having a rotary or swinging type outlet gate or valve for controlling the amount of fluidized pulverulent material which is permitted to flow from the lower end of the gas-permeable deck into the stream of pressure gas flowing from the upper end of the vessel into the pneumatic conveyor line.

The simplicity of the present control valve, coupled with the fact that no adjustments are required over the life thereof, allows it to be conveniently located in the system where access for maintenance and adjustments would be hard and costly to provide. The construction of the control valve is such that it lends itself to applications embodying baffles for maintaining the main body of pulverulent material within the vessel which are less costly and easier to install.

The invention will be further described in connection with the accompanying drawings, in which.

Referring now to the drawings, and first to the form of the invention shown in Figs. 1 to 4, the storage vessel in which the pulverulent material is to be stored and subsequently discharged is designated by the reference character 1. It may be of any shape and may be stationary, portable, or may form the vessel of a railroad tank car or other wheeled vehicle. In the drawings it is shown as an elongated, horizontal, cylindrical tank, and as being mounted on skids 2 and 2' extending longitudinally of the vessel at each side thereof. The skids are formed of channel irons and are secured to the vessel by brackets 3 and 3'. The ends of the skids extend beyond the respective ends of the vessel and are inclined upwardly and outwardly from the ends of the lower flanges. Draw pipes 4 and 4' connect the ends of the skids at both ends of the vessel. A tow member of any kind may engage the draw pipe at either end of the vessel for dragging it to a new location. The upper side of the tank has a filling neck 5 which may be sealed by a closure 6 of any kind.

Figure 1:
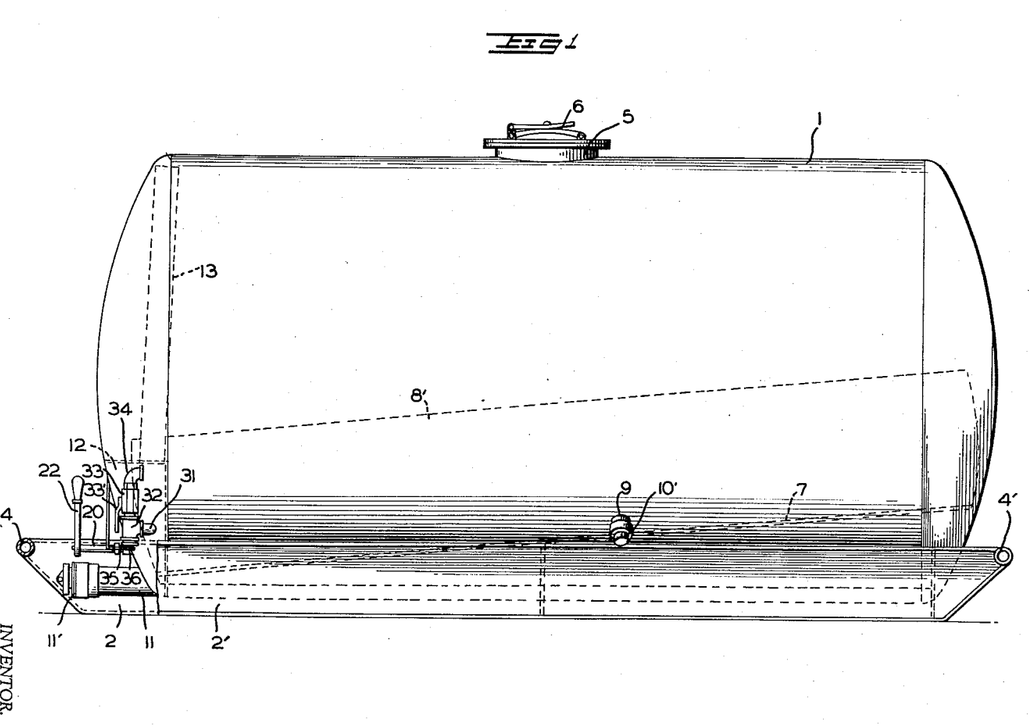
Fig. 1 is a side elevational view, with parts broken away, of a storage and discharge vessel embodying one form of the invention.
Figure 3:
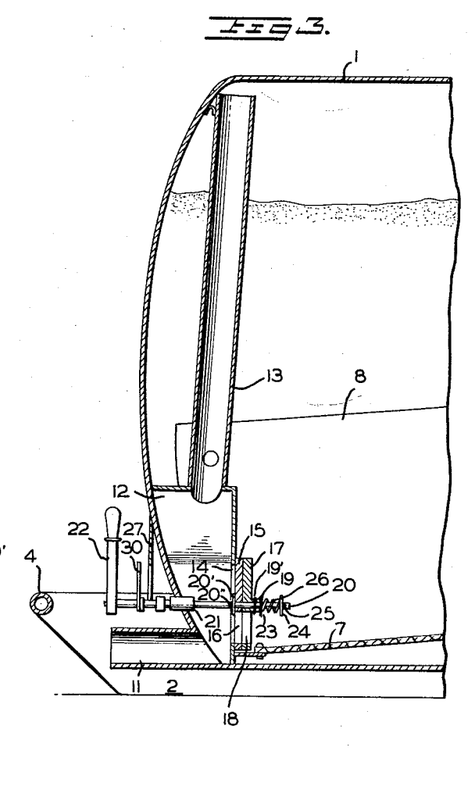
Fig. 3 is a vertical sectional view taken longitudinally through the discharge end of the vessel.

A gas-permeable deck 7 extends lengthwise of the vessel from one end to the other. It may be made of any material having the desired gas permeability, but preferably is made of multi-ply woven textile material, similar to the material used as canvas belting. The deck 7 extends transversely across the vessel at its lower side and is spaced from the bottom of the vessel. It is inclined upwardly from the discharge end of the vessel to the other end at an angle slightly greater than the angle of repose of any material which is to be stored within the vessel, when such pulverulent material is in a fluidized state.

Slop sheets 8 and 8' extend from the sides of the gas-permeable deck upwardly and outwardly to the adjacent sides of the vessel. These sheets slope downwardly towards the gas-permeable deck at an angle greater than the angle of repose of the pulverulent material to be stored in the vessel, when such material is in its unaerated state, so that the pulverulent material will always flow down the slope sheets to the gas-permeable deck.

The space beneath both slope sheets is in direct communication with the space beneath the gas-permeable deck to provide a plenum chamber into which a suitable gas, in most instances air, may be introduced to pass upwardly through the gas-permeable deck to fluidize the pulverulent material thereon, and to cause it to flow along the upper surface of the deck towards the discharge end of the vessel. Such gas may be introduced into the plenum chamber through gas inlets 9 and 9' located at When gas is not being introduced through the inlets they may be closed by suitable caps 10 and 10' to keep out opposite sides of the vessel, beneath the slope sheets, foreign matter. Gas inlets are provided at each side of the vessel so that they may handily be connected to a source of gas supply located at either side of the vessel.

The end of the vessel adjacent the lower end of the gas-permeable deck 7 has a discharge outlet 11 through which the pulverulent material may be discharged from the vessel into a conveying line to be carried, in suspension, to any desired location. When material is not being discharged from the vessel, the outer end of the discharge outlet is closed with a cap 11' of any suitable type to prevent the entrance of foreign matter into the vessel.

Baffling means is provided in the vessel at its discharge end to restrain the bulk of the material in the vessel from flowing through the discharge outlet. This baffling means comprises a housing 12 surrounding the discharge outlet and a gas conduit 13 extending from the housing upwardly to adjacent the top of the vessel. This conduit forms a passageway through which pressure gas in the upper portion of the vessel may flow, as a stream, downwardly to the housing 12 and out through the discharge outlet 11, as will be more fully described.

Figure 4:
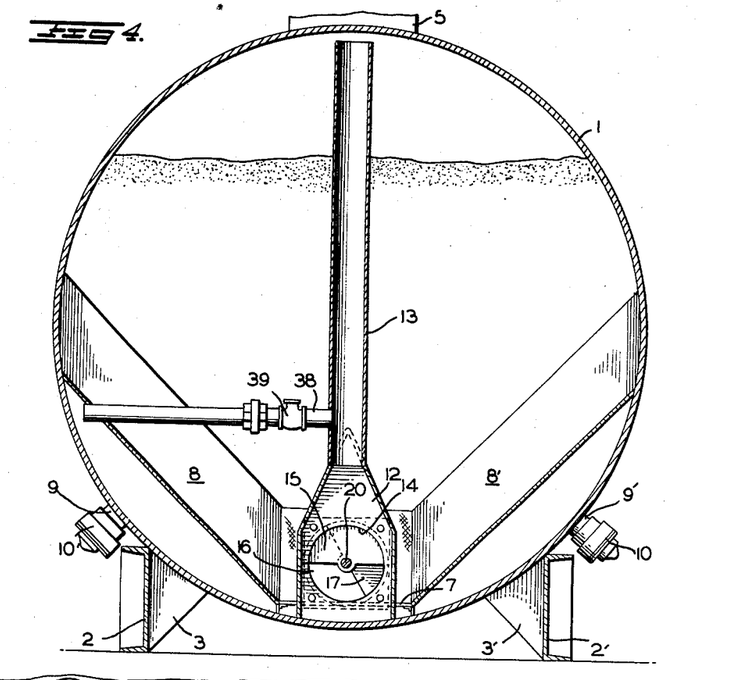
Fig. 4 is a sectional view on line 4—4 of Fig. 3.

The inner wall of the housing 12 has an opening 14 behind which is secured a bearing plate 15 having an opening 16 therein opposite the lower end of the gas-permeable deck for the flow of fluidized material to be discharged through the outlet 11. The effective area of the opening 16 for the flow of material is controlled by a rotatable disc valve 17 having an opening 18. The disc valve 17 carries a collar 19. A key 19' passes through the collar into a slot or groove formed in a shaft 20 on which the collar is mounted. In this manner, the disc valve is non-rotatably secured to the shaft 20 but still may move axially along the shaft. The shaft 20 is journaled in the bearing plate 15 and a packing gland 21 secured to the end wall of the vessel. The outer end of the shaft carries a handle 22 by means of which the shaft 20 and the valve disc 17 secured thereto may be rotated.

The inner end of the shaft 20 extends beyond the collar 19 and carries a pair of spaced washers 23 and 24. A pin 25 extending through the shaft keeps the washer 24 from moving off the inner end of the shaft. A coil spring 26 is mounted between the washers 23 and 24 and exerts a constant force on the inner washer 23 which in turn causes the valve disc to be resiliently held against the inner face of the bearing plate 15. A washer 20' is secured to the shaft 20 by a key 20''. The washer 20' forms a bearing member against the side of the bearing plate 15 opposite the side against which the valve disc 17 bears.

The valve disc 17 may be rotated so that its opening 18 fully registers with the opening 16 in the bearing plate to permit maximum flow of fluidized pulverulent material from the lower end of the gas-permeable deck to the discharge 11, or it may be rotated to completely close the opening 16, or it may be rotated to any intermediate position to permit the desired flow of pulverulent material from the gas-permeable deck to the discharge outlet. Thus, the bearing plate 15 and the valve disc 17 form an effective valve for controlling the discharge of pulverulent material from the gas-permeable deck to the discharge outlet 11, and a discharge control valve which will require no adjustments over the life thereof.

Figure 2:
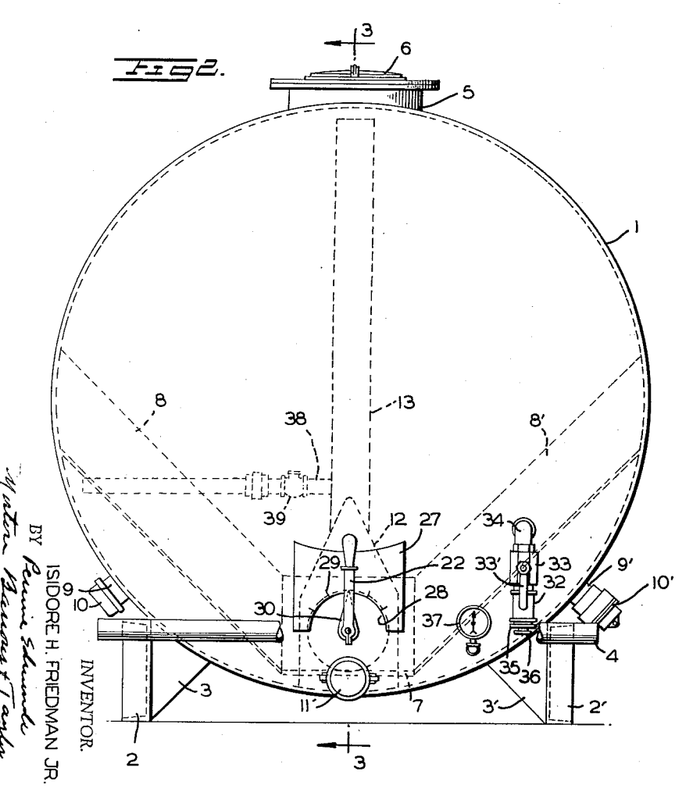
Fig. 2 is an end view of the vessel shown in Fig. 1.

An indicator plate 27 is welded or otherwise secured to the end wall of the vessel. The lower portion of the front face of the indicator plate 27 is provided with a semi-circular cut-out at its central portion, as indicated at 28, and carries indicia 29 indicating the extent to which the valve disc uncovers the opening 16 in the bearing plate 15. The semi-circular edge is positioned concentrically with the axis of the shaft 20 and the shaft has a pointer 30 fixedly secured thereto. The pointer 30 is so fixed to the shaft 20 as to indicate the extent to which the opening in the bearing plate 15 and the opening in the disc valve 17 register with one another.

Through accident or misoperation, the material being conveyed through the conveyor line may form an obstruction or plug in the conveyor line. In such cases the continued forcing of gas into the conveyor line merely tends to densify the plug of material forming the obstruction, and if the gas is carrying suspended material the suspended material will be deposited behind the plug and further obstruct the conveyor line. To facilitate the removal of any such obstructions or plugs when they do form, and to open up the conveyor line, a pipe 31 communicates with the interior of the vessel in the region below the slope sheets. The outer end of the pipe 31 is connected to a T or compartment 32. The lower end of a relief valve 33, having an operating handle 33', is connected to the upper leg of the T, while the upper end of the relief valve is connected to an elbow 34 which opens to the atmosphere. A vacuum relief valve 35 having a regulator knob 36 is connected to the lower leg of the T. When an obstruction occurs in the pneumatic conveyor line leading from the discharge outlet 11, the handle 22 is swung to its fully closed position so that the flow of additional pulverulent material into the conveyor line is discontinued. The handle of the relief valve 33 is then alternately swung between its fully open position and its fully closed position. When the valve 33 is open, the compacting pressure in the vessel and the connected conveyor line behind the obstruction is relieved by being exhausted to the atmosphere through the pipe 31 and elbow 34. When the relief valve 33 is again closed the pressure again builds up in the vessel and the conveyor line behind the obstruction. By repeatedly opening the valve 33, and almost immediately closing it, the compacting gas pressure behind the obstruction is intermittently relieved. This procedure has been found to be effective in clearing the conveying line of obstructions or plugs which may form therein. After the obstruction has been removed, the discharge control valve is re-opened to again permit the flow of pulverulent material from the lower end of the gas-permeable deck through the discharge outlet into the conveyor line.

A pressure gauge 37 is fitted into the end of the vessel and communicates with the interior of the vessel. Any obstruction or plug forming in the conveyor line will result in an increase in the pressure in the vessel and will be indicated by the pressure gauge. The pressure gauge will also indicate when the obstruction has been removed. Therefore, the person opening and closing the valve 33 to create the impulses to be passed through the conveyor line to impact on the obstruction will watch the pressure gauge, and as soon as the maximum pressure indicated by it when the valve 33 is closed is not above the normal operating pressure, he will know that the obstruction has been removed from the conveyor line and the discharge control valve again may be opened to permit the flow of fluidized pulverulent material from the vessel through the discharge outlet into the conveyor line.

After the vessel has been unloaded, the caps 10' and 11' will be applied to the gas inlet 10 and the discharge outlet 11, respectively, to prevent the entrance of foreign matter into the vessel. The air remaining in the vessel will be at an elevated temperature, resulting from its compression in the blower or other means employed for its supply to the vessel, and since the gas inlet and gas outlet from the vessel are both closed, subsequent reduction of the temperature of the confined air, upon standing for any length of time, tends to reduce the pressure within the vessel below atmospheric pressure. When such pressure reduction occurs, the vacuum relief valve 35 opens to bleed atmospheric air into the vessel to maintain a balance between the vessel pressure and atmospheric pressure, which is well within the stress limits of the vessel structure. The adjusting knob 36 may be used to modify the pressure differential required to open the valve 35, but any change in setting of the valve 35 generally will be necessary only when extreme variations in the residual air temperature are contemplated, as is likely to occur when the vessel form part of a vehicle which is likely to be used in various locations of widely varying ambient temperatures and the source of gas supply is a pump carried by the vehicle.

When the vessel has been standing with no gas being supplied to the plenum chamber, the gas pressure above and below the slope sheets will be the same. That is also true when gas is being supplied to the plenum chamber, except for the pressure differential which exists across the gas-permeable deck. When gas is being supplied to the plenum chamber and is suddenly cut off, and the pressure bneath the gas-permeable deck and the slope sheets is relieved, the gas-permeable deck and the slope sheets are not only subjected to the force exerted on them by the weight of the overlying pulverulent material, but also by the force exerted by the pressurized gas above them. These combined forces may be more than the slope sheets are constructed to withstand.

To provide for the equalization of the pressure in the vessel above and below the slope sheets, a pipe 38 leads from the space bneath the gas-permeable deck and slope sheets to the gas conduit 13 extending from the top of the housing to the upper portion of the vessel. The pipe 38 is provided with a check valve 39 which closes against pressure exerted on it from beneath the slope sheets, but which will open on pressure exerted on it from within the main part of the vessel, downwardly to the conduit 13. When the supply of gas to the plenum chamber is suddenly cut off, gas will flow from the upper part of the vessel downwardly through the gas conduit 13, check valve 39 and pipe 38 to the space beneath the slope sheets until the gas pressure above and below the slope sheets is substantially equalized. Thus any damage to the slope sheets because of a relatively higher gas pressure existing above them is avoided.

The means for equalizing the gas pressure above and below the slope sheets, as just described, forms no part of the present invention. It is disclosed and claimed in the application of Emile W. Lusted, Serial No. 782,556 filed December 23, 1958.

In operation of the form of the embodiment of the invention just described, the vessel 1 is moved to a position where the outlet 11 can be connected to a conveyor line and the gas inlet may be connected to a source of gas supply. Suitable connections are made between the gas outlet in the conveyor line and between the gas inlet and the source of gas supply and gas forced through the gas inlet into the plenum chamber beneath the gas-permeable deck and the slope sheets. The gas passing upwardly through the gas-permeable deck fluidizes the overlying pulverulent material and, on leaving the upper surface of the fluidized bed, accumulates in the upper portion of the vessel under pressure and passes as a flowing stream downwardly through the gas conduit 13, housing 12 and out through the discharge outlet 11 into the conveyor line.

After the pulverulent material overlying the gas-permeable deck has been fluidized, the handle 22 is rotated to open the discharge control valve to permit the desired flow of the fluidized pulverulent material from the lower end of the gas-permeable deck through the aligned openings in the bearing plate 15 and the valve disc 17. The gas stream flowing from the upper portion of the vessel downwardly through the gas conduit 13, housing 12 and outwardly through the discharge outlet 11 into the conveyor line entrains the fluidized pulverulent material as it passes through the discharge control valve and carries it in suspension through the discharge outlet and the conveyor line to the desired location. As long as pulverulent material remains in the vessel it will flow downwardly along the slope sheets onto the gas-permeable deck and be fluidized by the air passing upwardly through the gas-permeable deck and caused to flow downwardly along said deck to the discharge control valve and through it toward the discharge outlet.

In the form of the invention illustrated in Figs. 5 to 9, the invention is shown as applied to a horizontally-elongated, cylindrical vessel 40 of the same general character as that disclosed in Fig. 1, but which is provided with means for discharging the fluidized pulverulent material from the longitudinal center thereof instead of from an end as in the embodiment of the invention previously described. Like the vessel of Figs. 1 and 2, the vessel 40 is shown as being mounted on skids 41 and 41' extending longitudinally of the vessel at each side thereof. The skids are formed of channel irons having upper and lower outwardly-extending flanges and are secured to the vessel by brackets 42 and 42'. The ends of the skids extend beyond both ends of the vessel and are inclined upwardly and outwardly from the ends of the lower flanges. Draw pipes 43 and 43' connect the ends of the skids at both ends of the vessel to provide means for the connection to a tow member of any kind so that the vessel may be towed from place to place. Instead of being provided with the skids, the vessel of this embodiment might also form the tank of a railroad car or other wheeled vehicle, or it might be stationary.

Figure 5:
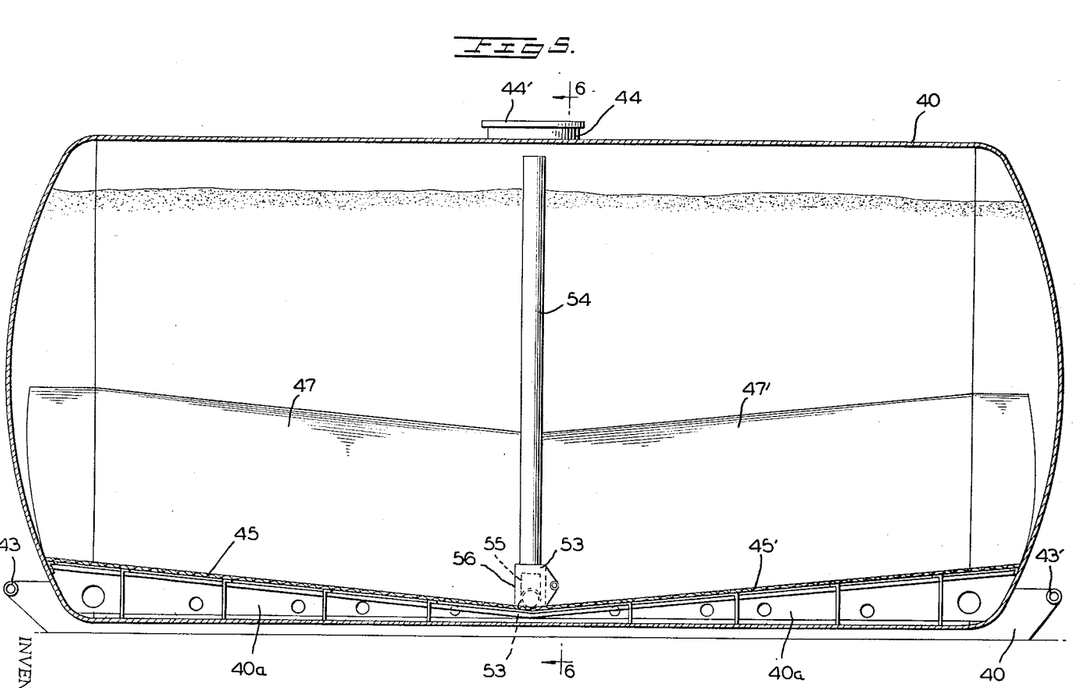
Fig. 5 is a longitudinal vertical sectional view through a tank having a center discharge.

The upper side of the tank has a filling neck 44 which may be sealed with a closure 44' of any kind.

Figure 6:
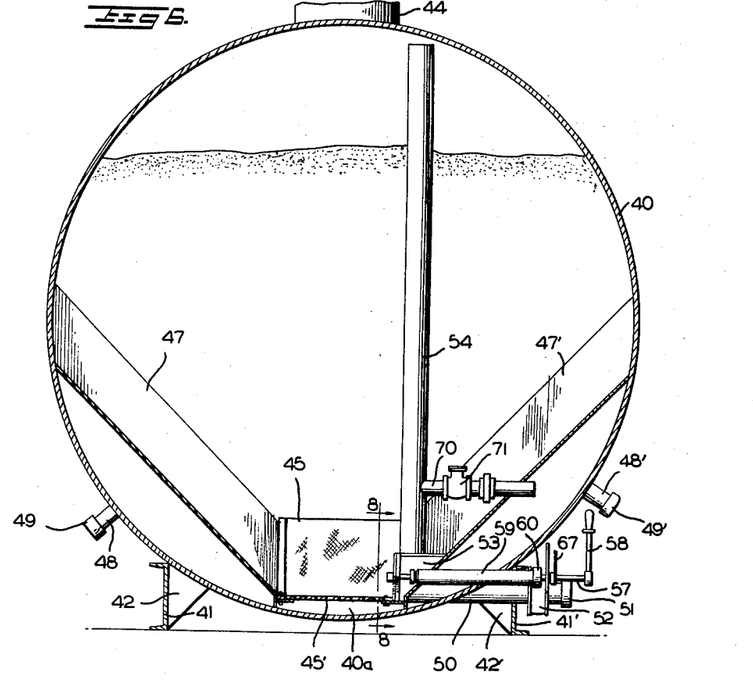
Fig. 6 is a transverse sectional view of the lower portion of the vessel on line 6—6 of Fig. 5.

Gas-permeable decks 45 and 45' are inclined downwardly from each end of the vessel 40 to the lower central portion of the vessel. These gas-permeable decks, like the gas-permeable deck of the first-described embodiment of the invention may be made of any material having the desired gas permeability, but preferably are made of a multi-ply woven textile material. The gas-permeable decks 45 and 45' extend transversely across the vessel at its lower side and are spaced from the bottom of the vessel. The upward inclination of the gas-permeable decks from the longitudinal center of the vessel, is at an angle slightly greater than the angle of repose of the pulverulent material which is to be stored within the vessel when such pulverulent material is in a fluidized state. Slope sheets 47 and 47' extend from the longitudinal side edges of the gas-permeable decks outwardly and upwardly to the sides of the vessel. These sheets slope downwardly towards the gas-permeable deck at an angle greater than the angle of repose of the pulverulent material, when such material is in its unaerated state, so that the pulverulent material always will flow down the slope sheets to the gas-permeable decks.

The space beneath the slope sheets is in direct communication with the space beneath the gas-permeable decks to provide a plenum chamber 40a into which a suitable gas may be introduced to pass upwardly through the gas-permeable decks to fluidize the pulverulent material thereon and to cause it to flow downwardly along the upper surface of the decks toward the center of the vessel.

Gas may be introduced into the plenum chamber through gas inlets 48 and 48' located at each side of the vessel, beneath the slope sheets. When gas is not being introduced through the inlets, they may be closed by suitable caps 49 and 49' to keep out foreign material.

The vessel has a discharge outlet 50 extending from the longitudinal center thereof outwardly through the side of the vessel for the discharge of material fluidized on the gas-permeable decks. The discharge outlet 50 is adapted to be connected to a conveyor line through which the discharged pulverulent material may be carried, in suspension, to any desired location. When pulverulent material is not being discharged from the vessel, the outer end of the discharge pipe is closed by a suitable cap 51 to prevent the entrance of foreign material into the vessel. The pipe 50 has a butterfly valve 52 for controlling the flow of material therethrough.

A housing 53 is formed about the inner end of the discharge outlet 50. A gas conduit 54 extends from the top of the housing upwardly to adjacent the top of the vessel. This conduit forms a passageway through which pressure gas in the upper portion of the vessel may flow, as a stream, downwardly to the housing 53 and out through the discharge outlet 50.

The inner wall of the housing 53 has a rectangular opening 55 formed therein opposite the discharge outlet 50 through which material fluidized on the gas-permeable deck may flow to the discharge outlet.

Figure 7:
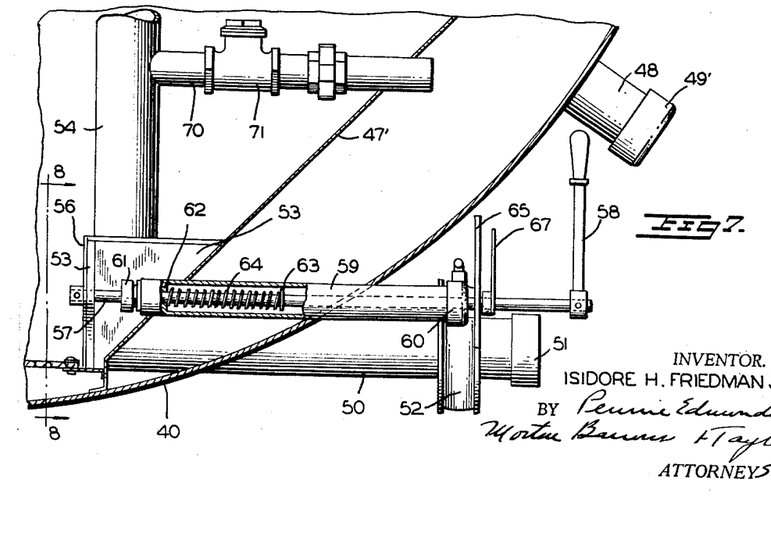
Fig. 7 is a detailed sectional view, on an enlarged scale, of parts shown in Fig. 6.
Figure 8:
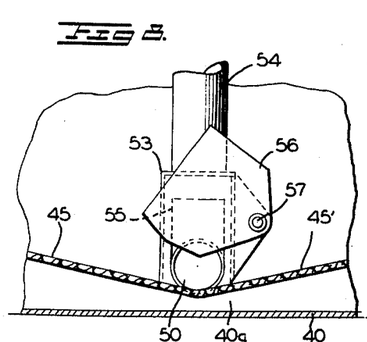
Fig. 8 is a detailed sectional view on line 8—8 of Fig. 7.

The flow of fluidized material from the gas-permeable deck through the opening 55 is controlled by a swinging gate 56 fixedly secured to the inner end of a shaft 57 which extends through the slope sheet 47' and the side wall of the container to a position outside the vessel. The outer end of the shaft 57 carries a handle 58 by means of which the shaft may be rotated and the swinging valve 56 swung to cover or uncover the opening 55 in the housing to any desired extent. The shaft 57 passes through a cylinder 59 mounted in the slope sheet 47' and the adjacent side wall of the vessel 40. The outer end of the cylinder is closed by a cap 60 and the inner end of the cylinder carries a packing gland 61 through which the shaft 57 passes. A plug 62 is placed in the inner end of the cylinder 59 around the shaft 57. The shaft 57 has a stop washer 63 secured to it where it passes through the cylinder 59. A coil spring 64 surrounds the shaft between the plug 62 and the stop washer 63 and exerts a force against the stop washer tending to urge the shaft outwardly of the cylinder. This exerts a resilient force which maintains the swinging valve 56 in contact with the inner face of the housing 53.

Figure 9:
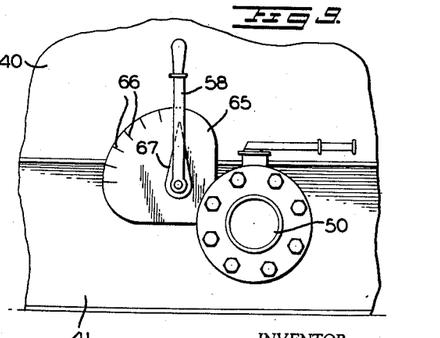
Fig. 9 is a detailed elevational view, as viewed from the right-hand side of Fig. 7.

An indicator plate 65 is welded to the outer flange of the butterfly valve 52 and has indicia 66 indicating to what extent the swinging valve 56 is in registry with the opening 55 in the inner wall of the housing 53. The indicia is arranged concentrically with the shaft 57, which passes through the indicator plate 65. The shaft has a pointer 67 fixedly secured thereto. The pointer is so fixed to the shaft 57 as to indicate the extent to which the opening in the valve 56 closes the discharge opening 55 through the inner face of the housing 53.

This embodiment of the invention is also provided with means for equalizing the pressure in the vessel above and below the slope sheets, similar to that disclosed in the previously-described embodiment of the invention, and comprises a pipe 70 connecting the space beneath the slope sheets to the gas conduit 54. The pipe 70 is provided with a check valve 71 which closes against pressure exerted on it from beneath the slope sheets but which will open on pressure exerted on it from within the main part of the vessel, downwardly through the gas conduit 54. The operation of the equalizing means is the same as that in the previously described embodiment of the invention.

The operation of this embodiment of the invention is substantially the same as the operation of the form of the invention disclosed in Figs. 1 to 4. After the vessel has been moved to the appropriate place and connected with the conveyor line and the source of gas supply and the necessary connections made, gas is introduced into the plenum chamber 40ª and passes upwardly through the gas-permeable decks 45 and 45' and fluidizes the overlying pulverulent material. The fluidized material flows downwardly from each end of the vessel along the gas-permeable decks to the center of the vessel and to a loaction opposite the discharge outlet 50. The gas leaving the upper surface of the fluidized material accumulates in the upper portion of the tank, under pressure, and flows downwardly, as a stream, through the gas conduit 54 and into the housing 53 from which it passes outwardly through the discharge outlet 50 to the conveyor line. When the gate 56 is opened to the desired extent, the fluidized material will flow through the opening 55 in the inner wall of the housing 53 and will immediately be entrained by the stream of gas flowing downwardly through the gas conduit 54 and housing 53 and be carried, in suspension, through the discharge outlet 50 and the connected conveyor line to the desired location.

If desired, the present form of the invention may be provided with means for removing obstructions which may form in the conveyor line, similar to the means disclosed in the embodiment of the invention illustrated in Figs. 1 to 4.

The present invention provides a very simple and effective means for controlling the discharge of fluidized pulverulent material from storage vessels which will operate throughout the life of the vessel with a minimum of necessary repairs. It also provide means whereby any obstruction which may form in the conveyor line may be removed by the creation in the conveyor line behind the obstructions, of impulses which will intermittently relieve the compaction upon and break down the obstructions so that the pulverulent material which forms the obstructions may be re-entrained by the conveying gas and carried through the conveyor line to the desired location.

Various changes may be made in the details of construction of the apparatus disclosed herein without departing from the invention or sacrificing any of the advantages thereof.

I claim:

1. Apparatus for discharging pulverulent material comprising a vessel, a gas-permeable deck adjacent the bottom of the vessel, a plenum chamber beneath the gas-permeable deck, means for introducing gas under pressure into said plenum chamber to pass upwardly through the gas-permeable deck into overlying pulverulent material to fluidize such material and to cause it to flow along said deck, said vessel having a discharge outlet adjacent its bottom, said discharge outlet forming the exit for material and gas from said vessel, the gas-permeable deck having a discharge end adjacent said discharge outlet, a housing surrounding the discharge outlet, a gas conduit, the lower end of said gas conduit being in communication with said housing and its upper end terminating within the upper portion of the vessel, and a discharge control valve at the discharge end of the gas-permeable deck for controlling the flow of fluidized pulverulent material from the gas-permeable deck to said discharge outlet, said discharge control valve comprising a pair of members having flat engaging faces, one of said members being fixed and having an opening therethrough for the flow of fluidized pulverulent material discharged from said gas-permeable deck, the other of said members being movable relative to said fixed member and having an imperforate portion to move across the opening in the other member to control the extent to which said opening is exposed for the flow of fluidized material therethrough, a rotatable shaft on which said movable valve member is rigidly mounted, one end of said shaft extending to outside the vessel so that it may be rotated from without the vessel to relatively adjust the movable valve member with respect to the fixed valve member, and means for constantly maintaining the flat faces of said valve members in contact with one another.

2. Apparatus as set forth in claim 1 in which the valve member having the opening therethrough forms a part of said housing.

3. Apparatus as set forth in claim 1 including spring means resiliently urging the flat faces of the valve members into contact with one another.

4. Apparatus as set forth in claim 3 in which the spring means is a coil spring and the spring surrounds said shaft.

5. Apparatus as set forth in claim 1 in which the movable valve member is a disc having an opening therethrough positioned to be brought into and out of registry with the opening in the fixed valve member as said shaft is rotated.

6. Apparatus as set forth in claim 1 including a fixed indicator plate outside the vessel and adjacent the shaft, an indicator fixedly secured to the shaft and movable across the indicator plate, said indicator plate having indicia to indicate the extent to which the discharge control valve is opened, the indicator being so fixed to the shaft, that as the shaft rotates, it will move relative to the indicia on the indicator plate and indicate the extent to which the control valve is open.

7. Apparatus as set forth in claim 1 in which the movable valve member is imperforate and is mounted on said shaft to swing across the opening in the fixed valve member as the shaft is rotated to cover and uncover the opening in said fixed member.

8. Apparatus as set forth in claim 1 including a cylinder enclosing said shaft, and a coil spring surrounds the shaft within said cylinder and exerts a force in an axial direction on said shaft to cause the flat face of the movable valve member to be resiliently urged against the flat face of said fixed valve member.

9. Apparatus for discharging pulverulent material comprising a vessel having a gas-permeable deck adjacent the bottom of the vessel, a plenum chamber beneath said gas-permeable deck, means for introducing a gas under pressure into said plenum chamber to pass upwardly through the gas-permeable deck into overlying pulverulent material to fluidize such material and to cause it to flow along said gas-permeable deck, said vessel having a discharge outlet for pulverulent material fluidized on said gas-permeable deck, the gas-permeable deck having a discharge end adjacent said discharge outlet, and means connecting the inside of the vessel to the surrounding atmosphere and including a vacuum relief valve which will open to admit atmospheric air into the vessel when the pressure within the vessel is at a predetermined pressure below atmospheric.

10. Apparatus as set forth in claim 9 in which the vacuum relief valve includes means to modify the pressure differential required to open it.

11. Apparatus for discharging pulverulent material comprising a vessel, a gas-permeable deck adjacent the bottom of the vessel, a plenum chamber beneath the gas-permeable deck, means for introducing gas under pressure into said plenum chamber to pass upwardly through the gas-permeable deck into overlying pulverulent material to fluidize such material and to cause it to flow along said deck, said vessel having a discharge outlet adjacent its bottom, said discharge outlet forming the exit for material and gas from said vessel, the gas-permeable deck having a discharge end adjacent said discharge outlet, means for conducting gas passing upwardly through the pulverulent material into the upper portion of the vessel downwardly to said discharge outlet to entrain fluidized material discharged from the discharge end of said gas-permeable deck and to carry it, in suspension, through a conveyor line connected to said discharge outlet, conduit means connecting the space within said vessel with the surrounding atmosphere, valve means in said conduit means to permit the space within said vessel to be connected to and closed off from the atmosphere, whereby upon an obstruction forming in said conveyor line, said valve may be alternately opened and closed to cause the compacting gas pressure behind such obstruction to be intermittently relieved.

12. Apparatus as set forth in claim 11 including discharge control valve means for controlling the discharge of fluidized material from the discharge end of said gas-permeable deck through said discharge outlet.

13. Apparatus as set forth in claim 12 in which said discharge control valve comprises a pair of members having flat engaging faces, one of said members being fixed and having an opening therethrough for the flow of fluidized pulverulent material discharged from said gas-permeable deck, and the other of said members being movable relative to said fixed member and having an imperforate portion to move across the opening in the other member to control the extent to which said opening is exposed for the flow of fluidized pulverulent material therethrough.

14. Apparatus for discharging pulverulent material comprising a vessel, a gas-permeable deck in the lower region of the vessel, a plenum chamber beneath the gas-permeable deck, means for introducing gas under pressure into said plenum chamber to pass upwardly through the gas-permeable deck, the gas-permeable deck differing in elevation along the vessel and having upper and lower deck areas so that the pulverulent material overlying the gas-permeable deck and fluidized by the upward passage of gas therethrough is caused to flow along the deck from said upper deck area to said lower deck area, said vessel having a discharge outlet in the region of the lower deck area, said discharge outlet forming the exit for material and gas from said vessel, a housing enclosing the discharge outlet, said housing having an aperture adjacent the lower deck area for the passage of material from the said lower deck area into said housing, a control valve at the aperture of the housing for controlling the flow of fluidized pulverulent material from the said lower deck area into said housing, said control valve comprising a pair of valve members having flat engaging faces, one of said valve members being fixed and having an opening therethrough for the flow of fluidized pulverulent material passing from said gas-permeable deck, the other of said valve members being movable relative to said fixed member and having an imperforate portion to move across the opening in the fixed member to control the extent to which said opening is exposed for the flow of material therethrough, a rotatable shaft, said movable valve member being mounted on said shaft, one end of said shaft extending to outside the vessel so that it may be rotated from without the vessel to move the movable valve member with respect to the opening in the fixed valve member, and a gas conduit in said vessel having its lower end in communication with said housing and its upper end in communication with the upper portion of the vessel.

15. Apparatus for discharging pulverulent material comprising a vessel, a gas-permeable deck in the lower region of the vessel, a plenum chamber beneath the gas-permeable deck, means for introducing gas under pressure into said plenum chamber to pass upwardly through the gas-permeable deck into overlying pulverulent material to fluidize such material and to cause it to flow along said deck, said vessel having a discharge outlet in its lower region, said discharge outlet forming the exit for material and gas from said vessel, a housing enclosing the discharge outlet, said housing having an opening arranged to receive fluidized material from said gas-permeable deck, a control valve at the opening of said housing for controlling the flow of fluidized pulverulent material from the gas-permeable deck through said opening and housing and toward said discharge outlet, said control valve comprising a pair of valve members having flat engaging faces, one of said valve members being fixed and having an opening therethrough for the flow of fluidized pulverulent material passing from said gas-permeable deck, the other of said valve members being movable relative to said fixed member and having an imperforate portion to move across the opening in the fixed member to control the extent to which said opening is exposed for the flow of fluidized material therethrough, a rotatable shaft, said movable valve member being mounted on said shaft, one end of said shaft extending to outside the vessel so that it may be rotated from without the vessel to rotate and displace the movable valve member with respect to the opening in the fixed valve member, and a gas conduit in said vessel having its lower end in communication with said housing and its upper end in communication with the upper portion of the vessel.

16. Apparatus for discharging pulverulent material comprising a vessel, a gas-permeable deck in the lower region of the vessel, a plenum chamber beneath the gas-permeable deck, the gas-permeable deck decreasing in elevation from adjacent a side of the vessel toward a lower deck area adjacent an opposite side of the vessel so that pulverulent material overlying the gas-permeable deck and fluidized by the upward passage of gas therethrough is caused to flow along the gas-permeable deck to the lower deck area thereof, a housing in the region of the lower deck area and having an opening therein adjacent the lower deck area, the vessel having a discharge outlet enclosed by the housing and located generally opposite the housing opening, said discharge outlet forming the exit for material and gas from said vessel, a control valve at the housing opening for controlling the flow of fluidized pulverulent material from the gas-permeable deck toward said discharge outlet, said control valve comprising a fixed valve member having an opening therein and a movable valve member having an imperforate portion, the fixed valve member and the movable valve member each having flat surfaces engaging one another, a rotatable shaft, said movable valve member being rigidly mounted on said shaft, said shaft extending to outside the vessel so that it may be rotated from without the vessel to displace the imperforate portion of the movable valve member with respect to the opening in the fixed valve member to permit selective opening and closing of said opening, resilient means for constantly maintaining the flat faces of said valve members in forced engagement, and a gas conduit in said vessel communicating at its lower end with the housing intermediate the opening and discharge outlet therein and at its upper end with the upper region of the vessel.

17. Apparatus for discharging pulverulent material comprising a horizontally elongated vessel, a gas-permeable deck in the lower region of the vessel, a plenum chamber beneath the gas-permeable deck, the gas permeable deck decreasing in elevation from adjacent the ends of the vessel towards a lower deck area intermediate the ends of the vessel so that pulverulent material overlying the gas-permeable deck and fluidized by the upward passage of gas therethrough is caused to flow along the gas-permeable deck to the lower deck area thereof, a housing in the region of the lower deck area and having an opening therein adjacent the lower deck area, the vessel having a discharge outlet enclosed by the housing and located generally opposite the housing opening, said discharge outlet forming the exit for material and gas from said vessel, a control valve at the housing aperture for controlling the flow of fluidized pulverulent material from the gas-permeable deck towards said discharge outlet, said control valve comprising a fixed valve member having an opening therein and a movable valve member having an imperforate portion, the fixed valve member and the movable valve member each having flat surfaces engaging one another, a rotatable shaft, said movable valve member being rigidly mounted on said shaft, said shaft extending to outside the vessel so that it may be rotated from without the vessel to displace the imperforate portion of the movable valve member with respect to the opening in the fixed valve member to permit selective opening and closing of said opening, resilient means for constantly maintaining the flat faces of said valve members in forced engagement, and a gas conduit in said vessel communicating at its lower end with the housing intermediate the opening and discharge outlet therein and at its upper end with the upper region of the vessel.

18. Apparatus for discharging pulverulent material comprising a vessel, a gas-permeable deck adjacent the bottom of the vessel, a plenum chamber beneath the gas-permeable deck, means for introducing gas under pressure into said plenum chamber to pass upwardly through the gas-permeable deck into overlying pulverulent material to fluidize such material and to cause it to flow along said deck, a discharge conduit in communication with the vessel through which gas in the vessel and pulverulent material fluidized on said gas-permeable deck is adapted to be discharged, the gas-permeable deck having a discharge end adjacent the entrance to said discharge conduit, a housing surrounding the entrance to said discharge conduit, a gas conduit, the lower end of said gas conduit being in communication with said housing and its upper end terminating within the upper portion of the vessel, and a discharge control valve adjacent the discharge end of the gas-permeable deck for controlling the flow of fluidized pulverulent material from the gas-permeable deck to said discharge conduit, said control valve comprising a pair of members having flat engaging faces, one of said members being fixed and having an opening therethrough for the flow of material discharged from said gas-permeable deck, the other of said members being movable relative to said fixed member and having an imperforate portion to move across the opening in the other member to control the extent to which said opening is exposed for the flow of material therethrough, a rotatable shaft, said movable valve member being rigidly mounted on said shaft so that on rotation of said shaft, the imperforate portion of the movable valve member may be relatively moved with respect to the opening of the fixed valve member to selectively open and close said opening for the flow of material from the discharge end of the gas-permeable deck to said discharge conduit, and means for constantly maintaining the flat faces of said valve members in contact with one another.

19. Apparatus for discharging pulverulent material comprising a vessel, a gas-permeable deck adjacent the bottom of the vessel, a plenum chamber beneath the gas-permeable deck, means for introducing gas under pressure into said plenum chamber to pass upwardly through the gas-permeable deck into overlying pulverulent material the fluidize such material and to cause it to flow along said deck, said vessel having a discharge outlet adjacent its bottom, said discharge outlet forming the exit for material and gas from said vessel, the gas-permeable deck having a discharge end edjacent said discharge outlet, a housing surrounding the discharge outlet, a gas conduit, the lower end of said gas conduit being in communication with said housing and its upper end terminating within the upper portion of the vessel, and a discharge control valve at the discharge end of the gas-permeable deck for controlling the flow of fluidized pulverulent material from the gas-permeable deck to said discharge outlet, said discharge control valve comprising a pair of members having flat engaging faces, one of said members being fixed and having an opening therethrough for the flow of fluidized pulverulent material discharged from said gas-permeable deck, the other of said members being movable relative to said fixed member and having an imperforate portion to move across the opening in the other member to control the extent to which said opening is exposed for the flow of fluidized material therethrough, a rotatable shaft on which said movable valve member is rigidly mounted, one end of said shaft extending to outside the vessel so that it may be rotated from without the vessel to relatively adjust the movable valve member with respect to the fixed valve member, means for constantly maintaining the flat faces of said valve members in contact with one another, a compartment, a conduit connecting said compartment with the inside of the vessel, a vacuum relief valve operable to admit atmospheric air into said compartment to pass through the conduit connecting said compartment with the vessel and into the vessel when the pressure within the vessel is a predetermined pressure below atmospheric, a conduit connecting said compartment with the atmosphere, and a valve in said last-named conduit, whereby upon an obstruction forming in said conveyor line, said last-named connecting valve may be alternately opened and closed to cause intermittent relief of the compacting pressure behind said obstructions.

References Cited in the file of this patent

UNITED STATES PATENTS

| | | |
|---|---|---|
| 2,565,835 | Adams | Aug. 28, 1951 |
| 2,681,748 | Weller | June 22, 1954 |
| 2,734,782 | Yalle | Feb. 14, 1956 |
| 2,746,807 | Tolman | May 22, 1956 |
| 2,814,531 | Murray | Nov. 26, 1957 |
| 2,842,406 | Standish | July 8, 1958 |
| 2,877,056 | Williams | Mar. 10, 1959 |

FOREIGN PATENTS

| | | |
|---|---|---|
| 751,162 | Great Britain | June 27, 1956 |

UNITED STATES PATENT OFFICE

CERTIFICATE OF CORRECTION

Patent No. 2,915,341                                                               December 1, 1959

Isidore H. Friedman, Jr.

It is hereby certified that error appears in the printed specification of the above numbered patent requiring correction and that the said Letters Patent should read as corrected below.

Column 2, line 56, for "Slop" read — Slope —; after line 72, insert — opposite sides of the vessel, beneath the slope sheets. —; column 3, line 3, strike out "opposite sides of the vessel, beneath the slope sheets."; column 5, line 6, for "form" read — forms —; column 7, line 66, for "loaction" read — location —; column 8, line 14, for "provide" read — provides —; column 12, line 37, for "the" read — to —; line 41, for "edjacent" read — adjacent —.

Signed and sealed this 10th day of May 1960.

(SEAL)
Attest:

KARL H. AXLINE                                                ROBERT C. WATSON
Attesting Officer                                           Commissioner of Patents